US012313250B2

(12) United States Patent
Fu et al.

(10) Patent No.: US 12,313,250 B2
(45) Date of Patent: May 27, 2025

(54) ELECTRICAL CONNECTION APPARATUS AND ILLUMINATION SYSTEM

(71) Applicant: SAVANT TECHNOLOGIES LLC, Cleveland, OH (US)

(72) Inventors: Yao Fu, Shanghai (CN); Cheng Shi, Shanghai (CN); Weikang Dai, Shanghai (CN)

(73) Assignee: SAVANT TECHNOLOGIES LLC, Cleveland, OH (US)

( * ) Notice: Subject to any disclaimer, the term of this patent is extended or adjusted under 35 U.S.C. 154(b) by 367 days.

(21) Appl. No.: 17/841,358

(22) Filed: Jun. 15, 2022

(65) Prior Publication Data

US 2022/0404007 A1 Dec. 22, 2022

(30) Foreign Application Priority Data

Jun. 18, 2021 (CN) ........................ 202110681490.6

(51) Int. Cl.

| | |
|---|---|
| ***F21V 23/06*** | (2006.01) |
| ***F21S 2/00*** | (2016.01) |
| ***F21V 23/00*** | (2015.01) |
| ***H01R 13/62*** | (2006.01) |
| ***H01R 13/621*** | (2006.01) |
| ***H01R 13/627*** | (2006.01) |
| ***H01R 31/06*** | (2006.01) |

(52) U.S. Cl.

CPC .............. *F21V 23/06* (2013.01); *F21S 2/005* (2013.01); *F21V 23/007* (2013.01); *H01R 13/6205* (2013.01); *H01R 13/6215* (2013.01); *H01R 13/6271* (2013.01); *H01R 31/06* (2013.01)

(58) Field of Classification Search

CPC ........ F21V 23/06; F21V 23/007; F21V 2/005; H01R 13/6205; H01R 13/6215; H01R 13/6271; H01R 31/06

USPC .................................................. 439/928, 357

See application file for complete search history.

(56) References Cited

U.S. PATENT DOCUMENTS

| | | | | |
|---|---|---|---|---|
| 5,412,248 A * | 5/1995 | Murari | H01R 31/06 | 257/692 |
| 5,941,714 A * | 8/1999 | Gorbet | H01R 12/721 | 439/38 |

(Continued)

FOREIGN PATENT DOCUMENTS

| | | |
|---|---|---|
| CN | 208779154 U | 4/2019 |
| CN | 210373087 U | 4/2020 |
| CN | 215528131 U | 1/2022 |

*Primary Examiner* — Gary F Paumen

(57) ABSTRACT

The present application relates to an electrical connection apparatus and an illumination system. The electrical connection apparatus comprises: a strip-shaped main body; a first and a second electrical connection terminals, provided at a first end and a second end of the main body respectively, and configured to be electrically connected each other and to a first electrical and a second interfaces respectively; and a spacing structure provided between the first end and the second end of the main body, having a platform portion provided at a part of the spacing structure facing towards the first end and a step portion higher than the platform portion, provided at a part of the spacing structure facing towards the second end, and the step portion fits the surface of the second electrical interface. The technical solutions of the present application provide a stable electrical connection between interfaces.

14 Claims, 5 Drawing Sheets

(56) References Cited

U.S. PATENT DOCUMENTS

| | | | | |
|---|---|---|---|---|
| 7,029,286 | B2 * | 4/2006 | Hall | H01R 13/506 439/63 |
| 8,052,473 | B2 * | 11/2011 | Chiang | H01R 9/03 439/607.41 |
| 8,111,022 | B2 * | 2/2012 | Snijder | F21V 23/06 362/225 |
| 10,531,542 | B2 * | 1/2020 | Rodinger | H05B 45/20 |
| 2016/0261065 | A1 * | 9/2016 | Chen | H01R 13/6205 |
| 2017/0256883 | A1 * | 9/2017 | Kim | H01R 9/2458 |
| 2019/0052007 | A1 * | 2/2019 | Pao | H01R 12/7052 |
| 2019/0089093 | A1 * | 3/2019 | Liu | H01R 12/7088 |
| 2020/0132288 | A1 * | 4/2020 | Ouyang | F21V 23/023 |
| 2020/0194929 | A1 * | 6/2020 | Li | H01R 13/504 |
| 2020/0332992 | A1 * | 10/2020 | Zhang | F21V 23/008 |

* cited by examiner

ELECTRICAL CONNECTION APPARATUS AND ILLUMINATION SYSTEM

CROSS-REFERENCE TO RELATED APPLICATIONS

This application claims the benefit of Chinese Patent Application Serial Number 202110681490.6, filed Jun. 18, 2021, which is herein incorporated by reference.

TECHNICAL FIELD

The present application relates to the field of connection of electrical appliances. In particular, the present application relates to an electrical connection apparatus and an illumination system.

BACKGROUND

An electrical appliance has one or more sockets. By connecting plugs supplying electric power and the sockets of the electrical appliance, the electric power can be provided to the electrical appliance. Two or more electrical appliances may be electrically connected to each other by means of sockets via a bridge, so that electric power is transferred from one electrical appliance to another electrical appliance, thereby achieving common control of the two or more electrical appliances.

Both ends of the bridge are plugs (or male plugs), so as to be electrically connected to two sockets (female plugs) of the electrical appliances respectively, and provide electric power transmission between the two sockets.

SUMMARY

The embodiments of the present application provide an electrical connection apparatus and an illumination system, so as to at least solve the problem in the prior art that it is inconvenient to achieve connection between multiple sockets.

According to one aspect of embodiments of the present application, an electrical connection apparatus is provided, comprising: a main body, the main body being strip-shaped, and the main body having a first end, a second end opposite to the first end, and a spacing structure provided between the first end and the second end; a first electrical connection terminal, provided at the first end, and configured to be electrically connected to a first electrical interface; and a second electrical connection terminal, provided at the second end and configured to be electrically connected to a second electrical interface, and the second electrical connection terminal being electrically connected to the first electrical connection terminal, wherein the spacing structure has a platform portion and a step portion, the platform portion is provided at a part of the spacing structure facing towards the first end, the step portion is provided at a part of the spacing structure facing towards the second end, and wherein the step portion is higher than the platform portion and the step portion fits the surface of the second electrical interface when the second electrical connection terminal is electrically connected to the second electrical interface.

In this way, the electrical connection apparatus can be electrically connected to the first electrical interface and the second electrical interface by means of the first electrical connection terminal and the second electrical connection terminal, achieving electrical connection between the first electrical interface and the second electrical interface. And the fitting between the step portion and the surface of the second electrical interface makes the connection between the electrical connection apparatus and the second electrical interface stable, avoiding incorrect connection or damage to the second electrical interface.

According to exemplary embodiments of the present application, the electrical connection apparatus further comprises: a connecting structure, the connecting structure being configured to fix the electrical connection apparatus and the first electrical interface to each other when the first electrical connection terminal is electrically connected to the first electrical interface.

In this way, the electrical connection apparatus can be stably connected to the first electrical interface, thereby avoiding incorrect connection or damage to the first electrical interface.

According to exemplary embodiments of the present application, the connecting structure comprises a main body platform module and a corresponding female socket module, wherein the main body platform module is provided at the platform portion of the main body, the female socket module is provided at the first electrical interface, and the main body platform module fits the female socket module so as to fix the electrical connection apparatus and the first electrical interface to each other.

In this way, the electrical connection apparatus can be fixed to the first electrical interface in a manner of the main body platform module fitting the corresponding female socket module, thereby improving the stability of connection between the electrical connection apparatus and the first electrical interface.

According to exemplary embodiments of the present application, the connecting structure comprises a through hole and a bolt, wherein the through hole is provided on the platform portion, and when the first electrical connection terminal is electrically connected to the first electrical interface, the bolt passes through the through hole to fit a threaded hole at the first electrical interface, so as to fix the electrical connection apparatus and the first electrical interface to each other.

In this way, the electrical connection apparatus can be fixed to the first electrical interface in a manner of the bolt fitting the threaded hole, thereby improving the stability of connection between the electrical connection apparatus and the first electrical interface.

According to exemplary embodiments of the present disclosure, the connecting structure comprises a first snap-fit portion, and when the first electrical connection terminal is electrically connected to the first electrical interface, the first snap-fit portion is snap-fitted to a corresponding second snap-fit portion provided at the first electrical interface, so as to fix the electrical connection apparatus and the first electrical interface to each other.

In this way, the electrical connection apparatus can be fixed to the first electrical interface in a manner of the first snap-fit portion being snap-fitted to the second snap-fit portion, thereby improving the stability of connection between the electrical connection apparatus and the first electrical interface, and the fixing manner being simple and convenient.

According to exemplary embodiments of the present disclosure, the connecting structure comprises a first magnetic attachment portion, and when the first electrical connection terminal is electrically connected to the first electrical interface, the first magnetic attachment portion is attached to a corresponding second magnetic attachment portion provided at the first electrical interface, so as to fix the electrical connection apparatus and the first electrical interface to each other.

In this way, the electrical connection apparatus and the first electrical interface can be fixed to each other in a manner of the first magnetic attachment portion being attached to the second magnetic attachment portion, thereby improving the stability of connection between the electrical connection apparatus and the first electrical interface, and the fixing manner being simple and convenient.

According to exemplary embodiments of the present disclosure, the first electrical connection terminal and the second electrical connection terminal are male plugs, and the first electrical connection terminal and the second electrical connection terminal are configured to, when electrically connected to the first electrical interface and the second electrical interface respectively, transmit at least one of electric power and electrical signal between the first electrical interface and the second electrical interface.

In this way, electric power and/or signal transmission between multiple interfaces or apparatuses having the interfaces can be achieved.

According to exemplary embodiments of the present disclosure, the first electrical interface and the second electrical interface are female plugs, and the first electrical interface and the second electrical interface are provided on different lamp holders respectively, and are configured to transmit at least one of electric power and electrical signal to a lamp on the lamp holder.

In this way, electric power and/or signal transmission between multiple interfaces or lamps having the interfaces can be achieved, so that a plurality of lamps can be controlled simultaneously.

According to exemplary embodiments of the present disclosure, at least one of the platform portion and the step portion is provided with chamfers at both ends along an axial direction of the main body.

In this way, the electrical connection apparatus can be easily unplugged from the interface, avoiding damage to the interface.

According to exemplary embodiments of the present disclosure, the first electrical connection terminal and the second electrical connection terminal are USB connection terminals, and the first electrical connection terminal and the second electrical connection terminal are provided on a circuit board accommodated in the main body.

In this way, the electrical connection apparatus can be implemented as a USB bridge, and the USB bridge can be formed by combining a circuit board provided with a USB terminal with the main body, the installation being simple and convenient.

According to another aspect of the present application, an illumination system is provided, comprising: the described electrical connection apparatuses; a plurality of lamps, each lamp of the plurality of lamps having at least two electrical interfaces via which the plurality of lamps are assembled and electrically connected to each other by means of the electrical connection apparatuses; and a controller, the controller being electrically connected to the electrical interfaces of one lamp of the plurality of lamps, and wherein the controller is configured to provide, by means of the electrical interfaces, control signals of the lamps to the lamp electrically connected to the controller, and by means of the electrical connection apparatuses, the control signals are transmitted, via the electrical interfaces of the plurality of lamps, to other lamps of the plurality of lamps.

In this way, the plurality of lamps are assembled and electrically connected to each other by means of the electrical connection apparatuses, and the controller can simultaneously control the plurality of lamps; moreover, connections between the plurality of lamps are stable, and the interfaces are not easily damaged.

The embodiments of the present application provide technical solution in which a step portion and a connecting structure are provided on an electrical connection apparatus and technical solution of an illumination system in which the plurality of lamps are connected by means of the electrical connection apparatus, so as to at least solve the technical problem that structures connected between multiple apparatuses are unstable and the interfaces are easily damaged, achieving the technical effect of providing a stable connecting structure between apparatuses.

BRIEF DESCRIPTION OF THE DRAWINGS

The drawings illustrated herein are used for providing further understanding of the present application and constitute a part of the present application, and the illustrative embodiments of the present application and illustrations thereof are used to explain the present application, rather than constitute inappropriate limitation on the present application. In the drawings.

DETAILED DESCRIPTION OF THE EMBODIMENTS

In order to make those skilled in the art better understand the solutions of the present application, hereinafter, the technical solutions in the embodiments of the present application will be described clearly and thoroughly with reference to the accompanying drawings of the embodiments of the present application. Obviously, the embodiments as described are only some of the embodiments of the present application, and are not all the embodiments. All other embodiments obtained by a person of ordinary skill in the art based on the embodiments of the present application without any inventive effort shall all fall within the scope of protection of the present application.

It should be noted that the terms “first”, “second” etc., in the description, claims, and accompanying drawings of the present application are used to distinguish similar objects, and are not necessarily used to describe a specific sequence or precedence order. It should be understood that the data so used may be interchanged where appropriate so that the embodiments of the present application described herein can be implemented in sequences other than those illustrated or described herein. In addition, the terms "comprise" and "have", and any variations thereof are intended to cover a non-exclusive inclusion, for example, a process, method, system, product, or device that comprises a series of steps or modules or units is not necessarily limited to those steps or modules or units that are clearly listed, but may comprise other steps or modules or units that are not clearly listed or inherent to such process, method, product, or device.

Figure 1:
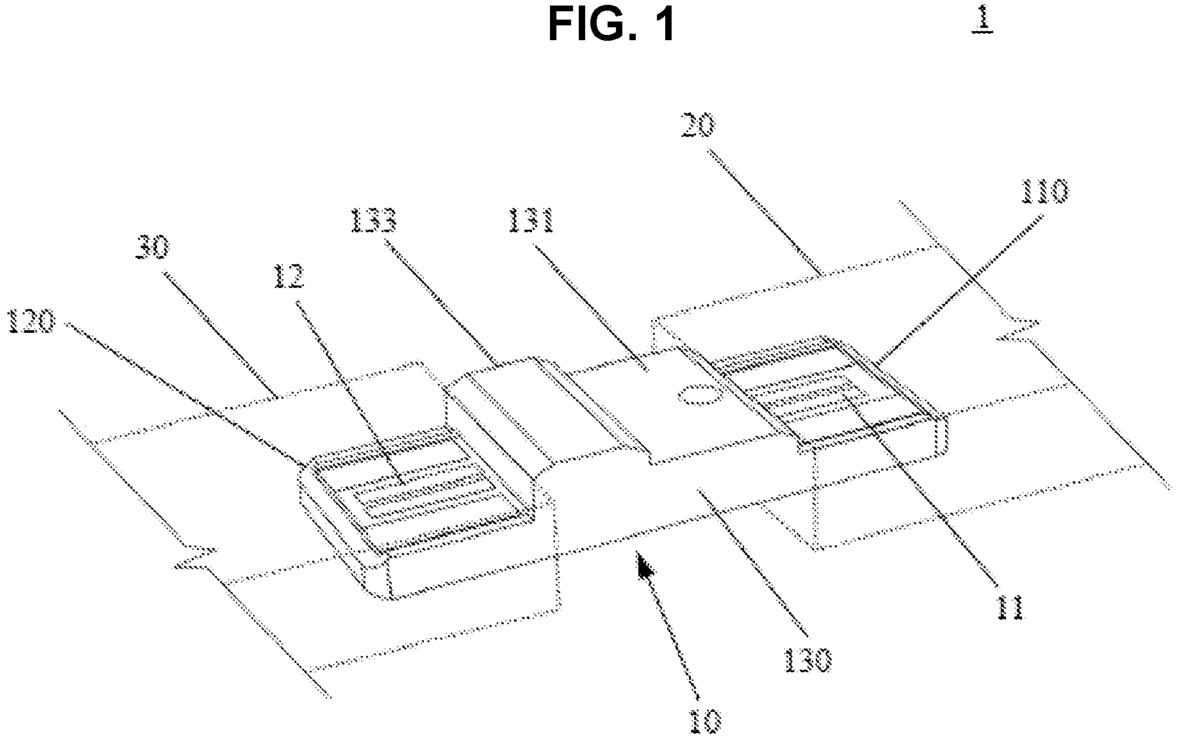
FIG. 1 is a schematic diagram of an electrical connection apparatus according to embodiments of the present application.

According to embodiments of the present application, an electrical connection apparatus is provided. FIG. 1 is a schematic diagram of an electrical connection apparatus according to embodiments of the present application. As shown in FIG. 1, an electrical connection apparatus 1 comprises: a main body 10, a first electrical connection terminal 11 and a second electrical connection terminal 12.

Specifically, as shown in FIG. 1, the main body 10 is strip-shaped, and the main body 10 has a first end 110, a second end 120 opposite to the first end 110, and a spacing structure 130 provided between the first end 110 and the second end 120.

The first electrical connection terminal 11 is provided at the first end 110, and is configured to be electrically connected to a first electrical interface 20. The second electrical connection terminal 12 is provided at the second end 120 and is configured to be electrically connected to a second electrical interface 30, and the second electrical connection terminal 12 is electrically connected to the first electrical connection terminal 11. It should be noted that although USB-TYPE A connection terminals are shown in the figures, the present application is not limited thereto. The first electrical connection terminal and the second electrical connection terminal may be any other connection terminals capable of providing an electrical connection, for example, USB-TYPE C, MINI-USB, MICRO-USB, any other customized connection terminals, and corresponding electrical interfaces are set according to the type of the connection terminals.

The spacing structure 130 has a platform portion 131 and a step portion 133, wherein the platform portion 131 is provided at a part of the spacing structure 130 facing towards the first end 110, and the step portion 133 is provided at a part of the spacing structure 130 facing towards the second end 120, and wherein the step portion 133 is higher than the platform portion 131, and the step portion 133 fits the surface of the second electrical interface 30 when the second electrical connection terminal 12 is electrically connected to the second electrical interface 30. For example, the spacing structure 130 is provided above the first electrical connection terminal 11 and the second electrical connection terminal 12, so as to function to separate two electrical interfaces when the electrical connection apparatus 1 is connected between the two electrical interfaces. Two electrical interfaces or apparatuses having the two electrical interfaces are separated from each other by means of the spacing structure 130, so that when the two electrical interfaces or the apparatuses having the two electrical interfaces are connected by means of the electrical connection apparatus 1, unnecessary pressing is not generated on the electrical interfaces and the electrical connection apparatus, the structures fit closely, and relative positions of the electrical interfaces and the electrical connection apparatus are accurate.

In this way, the electrical connection apparatus can be electrically connected to the first electrical interface and the second electrical interface by means of the first electrical connection terminal and the second electrical connection terminal, achieving electrical connection between the first electrical interface and the second electrical interface; and the fitting between the step portion and the surface of the second electrical interface makes the connection between the electrical connection apparatus and the second electrical interface stable, avoiding incorrect connection or damage to the second electrical interface.

Figure 2:
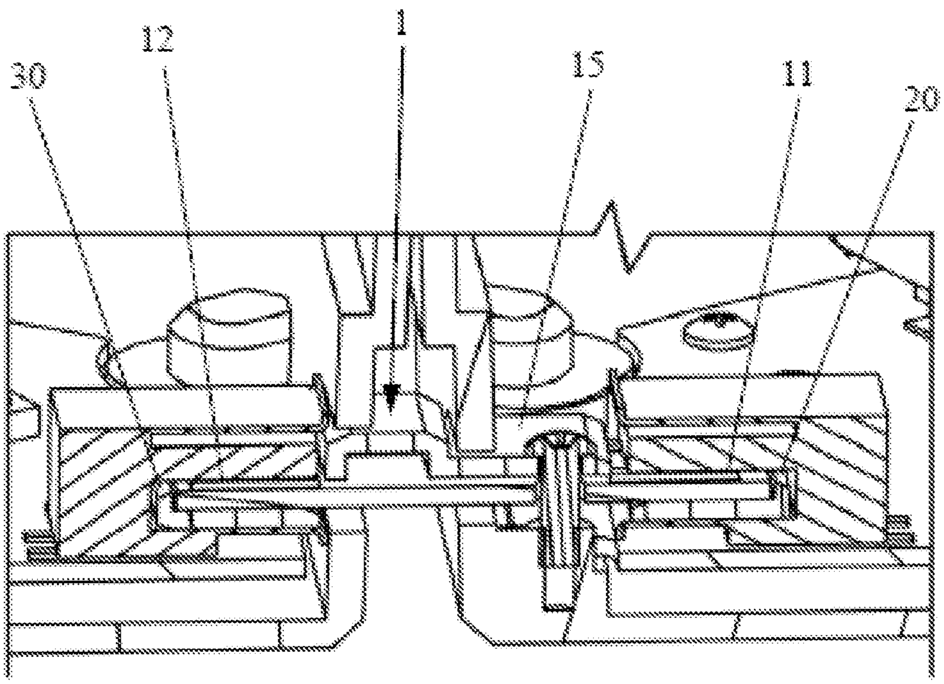
FIG. 2 is a cross-sectional view of an electrical connection apparatus according to an exemplary embodiment of the present application.

FIG. 2 is a cross-sectional view of an electrical connection apparatus according to another exemplary embodiment of the present application. As shown in FIG. 2, the electrical connection apparatus 1 further comprises: a connecting structure 15, the connecting structure 15 being configured to fix the electrical connection apparatus 1 and the first electrical interface 20 to each other when the first electrical connection terminal 11 is electrically connected to the first electrical interface 20. For example, the connecting structure 15 can be fixed at the position of the first electrical interface 20 by means of fitting between structural members. It should be understood that any suitable connecting structures can be used to fix the electrical connection apparatus 1 and the first electrical interface 20 to each other.

In this way, the electrical connection apparatus can be stably connected to the first electrical interface, thereby avoiding incorrect connection or damage to the first electrical interface.

Figure 3:
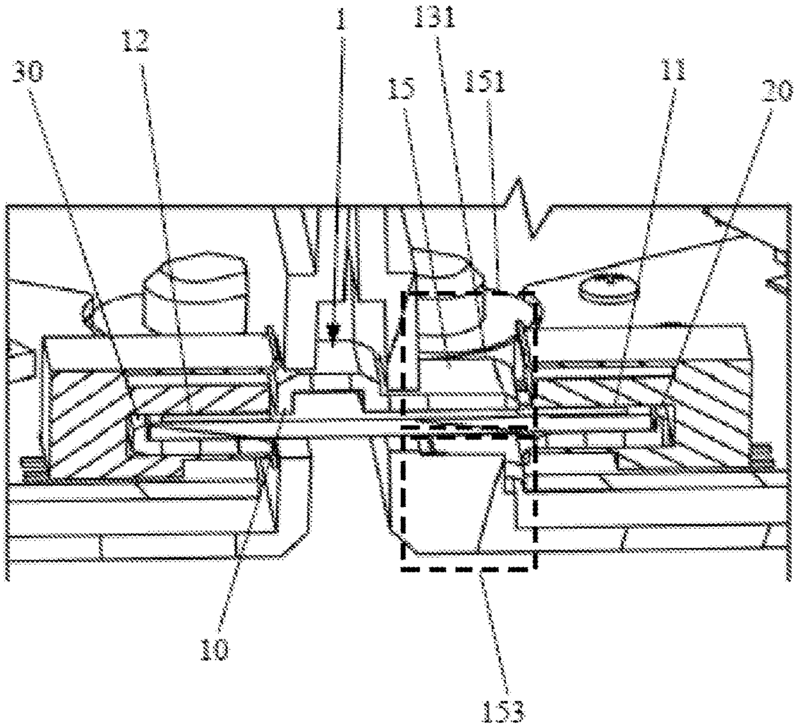
FIG. 3 is a cross-sectional view of an electrical connection apparatus according to another exemplary embodiment of the present application.

FIG. 3 is a cross-sectional view of an electrical connection apparatus according to another exemplary embodiment of the present application. As shown in FIG. 3, the connecting structure 15 comprises a main body platform module 151 and a corresponding female socket module 153. The main body platform module 151 is provided at the platform portion 131 of the main body 10, the female socket module 153 is provided at the first electrical interface 20, and the main body platform module 151 fits the female socket module 153 so as to fix the electrical connection apparatus 1 and the first electrical interface 20 to each other.

The female socket module 153 may be fixed at the first electrical interface 20, formed integrally with the first electrical interface 20, or formed integrally with an apparatus having the first electrical interface 20 in any suitable manner, as long as the electrical connection apparatus 1 and the first electrical interface 20 can be fixed to each other when the main body platform module 151 fits the female socket module 153.

In this way, the electrical connection apparatus can be fixed to the first electrical interface in a manner of the main body platform module fitting the corresponding female socket module, thereby improving the stability of connection between the electrical connection apparatus and the first electrical interface.

Figure 4:
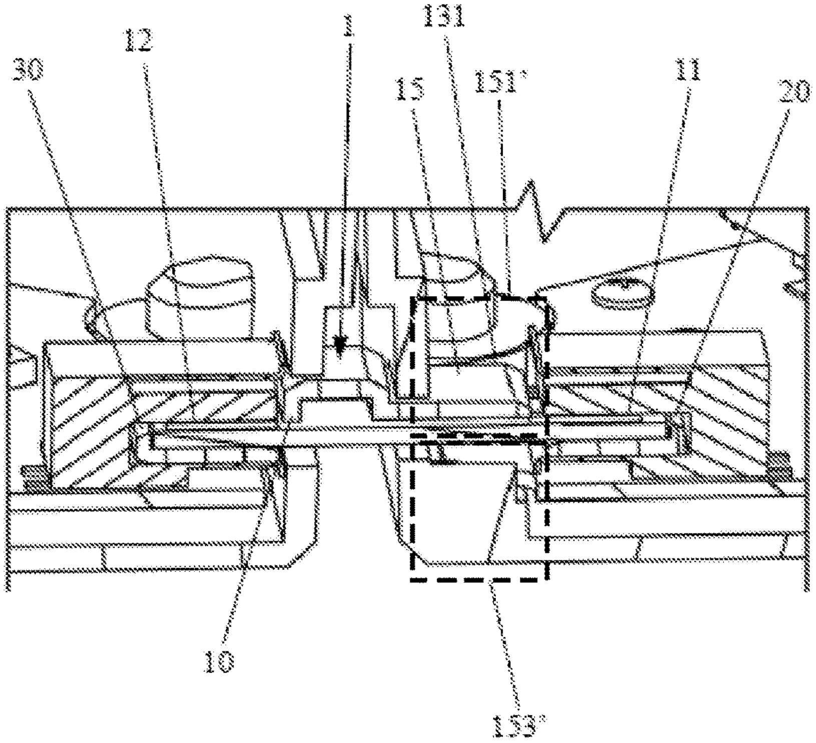
FIG. 4 is a cross-sectional view of an electrical connection apparatus according to another exemplary embodiment of the present application.

FIG. 4 is a cross-sectional view of an electrical connection apparatus according to another exemplary embodiment of the present application. As shown in FIG. 4, the connecting structure 15 comprises a first snap-fit portion 151', and when the first electrical connection terminal 11 is electrically connected to the first electrical interface 20, the first snap-fit portion 151' is snap-fitted to a corresponding second snap-fit portion 153' provided at the first electrical interface 20, so as to fix the electrical connection apparatus 1 and the first electrical interface 20 to each other. The first snap-fit portion

151' and the second snap-fit portion 153' may adopt any suitable snap-fit structure. The second snap-fit portion 153' may be fixed at the first electrical interface 20, formed integrally with the first electrical interface 20, or formed integrally with an apparatus having the first electrical interface 20 in any suitable manner, as long as the electrical connection apparatus 1 and the first electrical interface 20 can be fixed to each other when the first snap-fit portion 151' is snap-fitted to the second snap-fit portion 153'.

In this way, the electrical connection apparatus can be fixed to the first electrical interface in a manner of the first snap-fit portion being snap-fitted to the second snap-fit portion, thereby improving the stability of connection between the electrical connection apparatus and the first electrical interface, and the fixing manner being simple and convenient.

Figure 5:
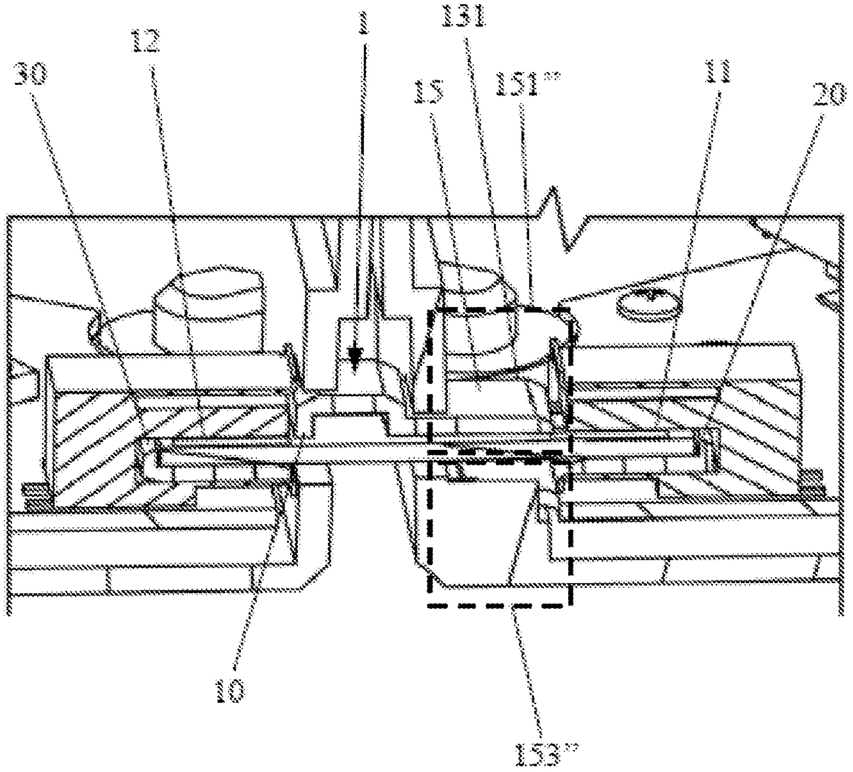
FIG. 5 is a cross-sectional view of an electrical connection apparatus according to another exemplary embodiment of the present application.

FIG. 5 is a cross-sectional view of an electrical connection apparatus according to another exemplary embodiment of the present application. As shown in FIG. 5, the connecting structure 15 comprises a first magnetic attachment portion 151", and when the first electrical connection terminal 11 is electrically connected to the first electrical interface 20, the first magnetic attachment portion 151" is attached to a corresponding second magnetic attachment portion 153" provided at the first electrical interface 20, so as to fix the electrical connection apparatus 1 and the first electrical interface 20 to each other. The first magnetic attachment portion 151" and the second magnetic attachment portion 153" may employ any suitable magnetic attachment structure. The second magnetic attachment portion 153" may be fixed at the first electrical interface 20, formed integrally with the first electrical interface 20, or formed integrally with an apparatus having the first electrical interface 20 in any suitable manner, as long as the electrical connection apparatus 1 and the first electrical interface 20 can be fixed to each other when the first magnetic attachment portion 151" is attached to the second magnetic attachment portion 153".

In this way, the electrical connection apparatus and the first electrical interface can be fixed to each other in a manner of the first magnetic attachment portion being attached to the second magnetic attachment portion, thereby improving the stability of connection between the electrical connection apparatus and the first electrical interface, and the fixing manner being simple and convenient.

Figure 6:
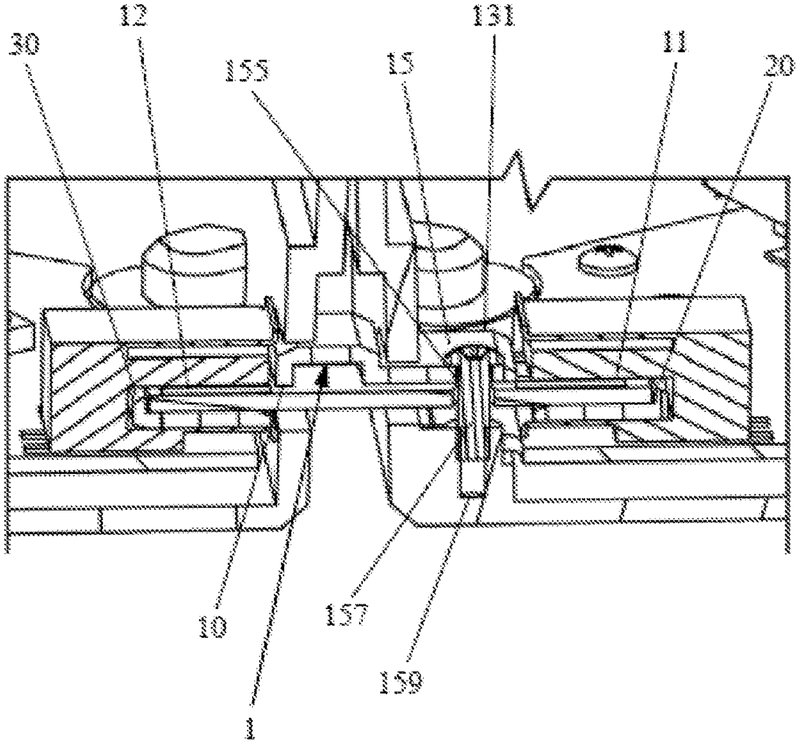
FIG. 6 is a cross-sectional view of an electrical connection apparatus according to another exemplary embodiment of the present application.

FIG. 6 is a cross-sectional view of an electrical connection apparatus according to another exemplary embodiment of the present application. As shown in FIG. 6, the connecting structure 15 comprises a through hole 155 and a bolt 157, wherein the through hole 155 is provided on the platform portion 131, and when the first electrical connection terminal 11 is electrically connected to the first electrical interface 20, the bolt 157 passes through the through hole 155 to fit a threaded hole 159 at the first electrical interface 20, so as to fix the electrical connection apparatus 1 and the first electrical interface 20 to each other. The threaded hole 159 can be integrally provided at the first electrical interface 20 or integrally provided in an apparatus having the first electrical interface 20. It is also possible to provide a component having the threaded hole 159 at the first electrical interface 20 or in an apparatus having the first electrical interface 20.

In this way, the electrical connection apparatus can be fixed to the first electrical interface in a manner of the bolt fitting the threaded hole, thereby improving the stability of connection between the electrical connection apparatus and the first electrical interface.

According to exemplary embodiments, the first electrical connection terminal 11 and the second electrical connection terminal 12 are male plugs, and the first electrical connection terminal 11 and the second electrical connection terminal 12 are configured to, when electrically connected to the first electrical interface 20 and the second electrical interface 30 respectively, transmit at least one of electric power and electrical signal between the first electrical interface 20 and the second electrical interface 30.

In this way, electric power and/or signal transmission between multiple interfaces or apparatuses having the interfaces can be achieved.

According to exemplary embodiments, the first electrical interface 20 and the second electrical interface 30 are female plugs, and the first electrical interface 20 and the second electrical interface 30 are respectively provided on different lamp holders, and are configured to transmit at least one of electric power and electrical signal to a lamp on a lamp holder. Specifically, a lamp has a lamp holder, the lamp holder is provided with the lamp head (an illumination device), and the lamp holder is provided with an electrical interface. By means of the electrical connection apparatus according to the present application, one lamp can be electrically connected, by the electrical interface on the lamp holder of the lamp, to an electrical interface on a lamp holder of another lamp, and at least one of electric power and electrical signal for controlling the lamps is transmitted by means of said electrical connection.

In this way, electric power and/or signal transmission between multiple interfaces or lamps having the interfaces can be achieved, so that the plurality of lamps can be controlled simultaneously.

Figure 7:
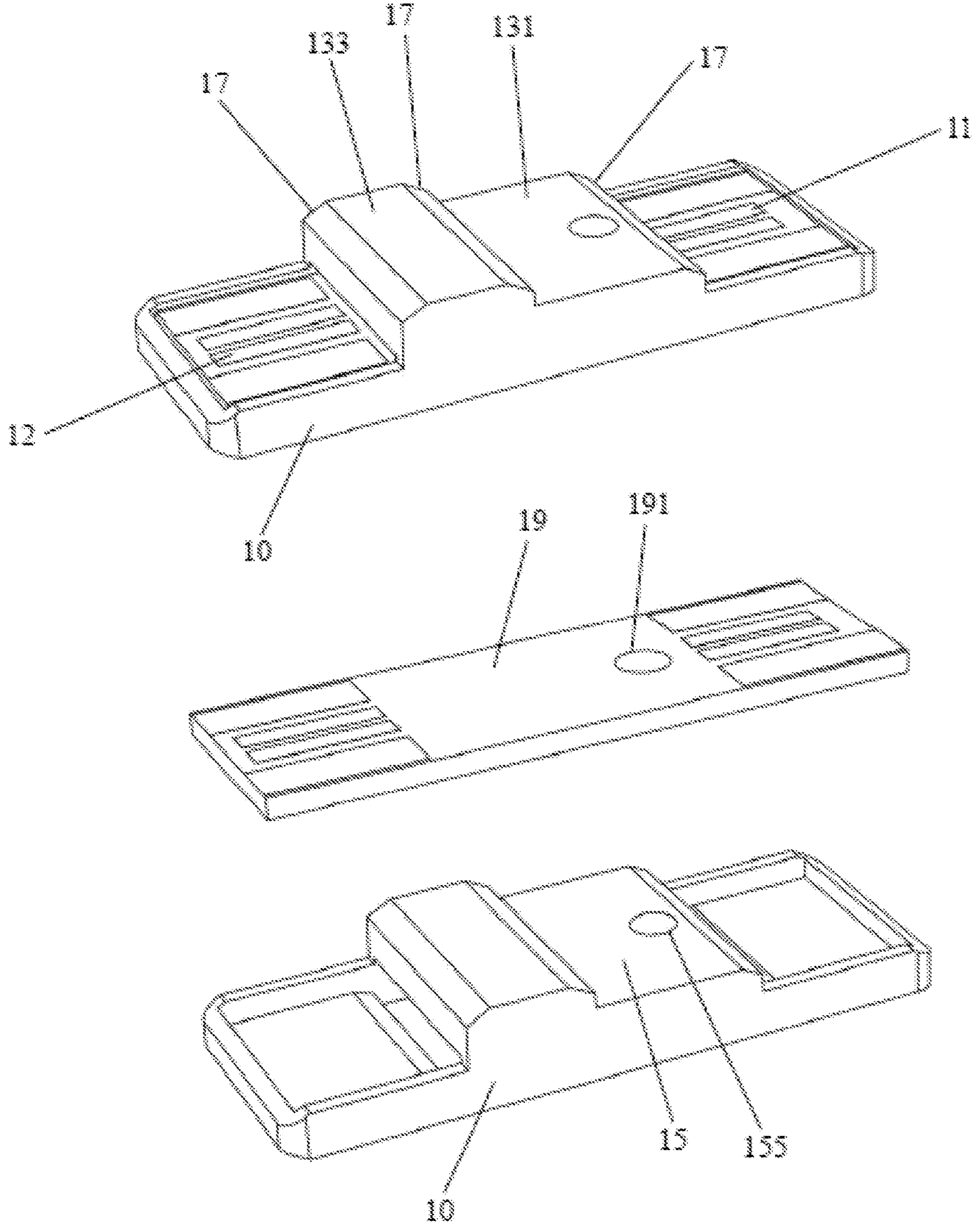
FIG. 7 are schematic diagrams of electrical connection apparatuses according to other exemplary embodiments of the present application.

FIG. 7 are schematic diagrams of electrical connection apparatuses according to other exemplary embodiments of the present application. As shown in FIG. 7, at least one of the platform portion 131 and the step portion 133 is provided with chamfers 17 at two ends along an axial direction of the main body 10. The presence of the chamfers 17 makes it easy for a user to hold the electrical connection apparatus when the electrical connection apparatus is plugged or unplugged.

In this way, the electrical connection apparatus can be easily unplugged from the interface, avoiding damage to the interface.

FIG. 7 are schematic diagrams of electrical connection apparatuses according to other exemplary embodiments of the present application. As shown in FIG. 7, the first electrical connection terminal 11 and the second electrical connection terminal 12 are USB connection terminals, and the first electrical connection terminal 11 and the second electrical connection terminal 12 are provided on a circuit board 19 accommodated in the main body 10. Specifically, as shown in FIG. 7, the circuit board 19 is a separate circuit board, and the first electrical connection terminal 11 and the second electrical connection terminal 12 are provided at two ends of the circuit board. The main body 10 has an accommodating space therein, and as shown in FIG. 7, the main body is provided with an opening through which the circuit board 19 can pass. The circuit board 19 can be placed into the main body 10 through the opening and fixed in the main body 10, thereby forming an integrated electrical connection apparatus. In exemplary embodiments, for example, in cases where the connecting structure 15 on the main body 10 comprises the through hole 155 (as shown in FIG. 6), the circuit board 19 is provided with a corresponding through hole 191 allowing for passing through of the bolt 157 as shown in FIG. 6.

In this way, the electrical connection apparatus can be implemented as a USB bridge, and the USB bridge can be formed by combining a circuit board provided with a USB terminal with the main body, the installation being simple and convenient.

Figure 8:
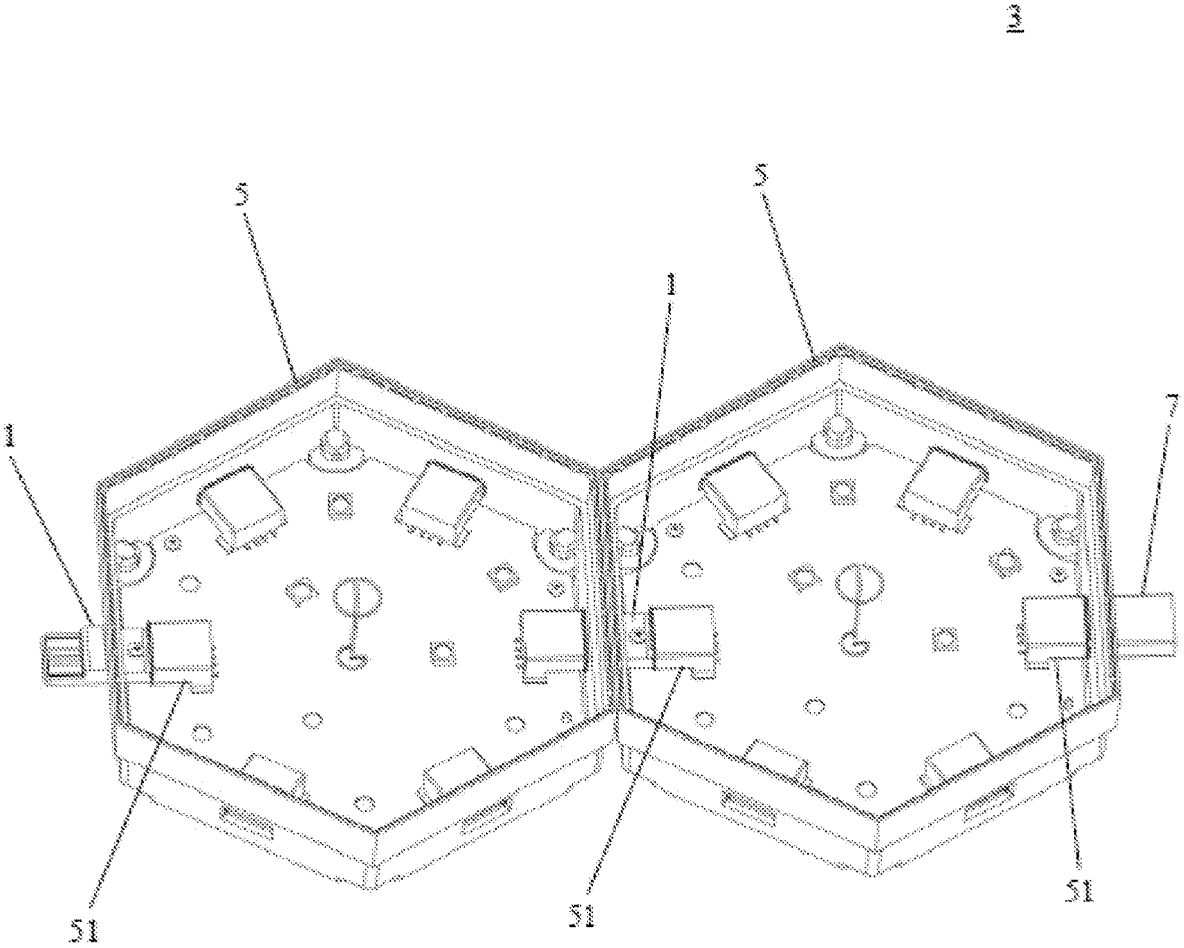
FIG. 8 is a schematic diagram of an illumination system according to embodiments of the present application.

According to embodiments of the present application, an illumination system is provided. FIG. 8 is a schematic diagram of an illumination system according to embodiments of the present application. As shown in FIG. 8, the illumination system 3 comprises: electrical connection apparatuses 1 according to the embodiments of the present application, a plurality of lamps 5 and a controller 7.

The electrical connection apparatus 1 according to the embodiments of the present application has been described above, and will not be repeated herein.

As shown in FIG. 8, each lamp 5 of the plurality of lamps 5 has at least two electrical interfaces 51 via which the plurality of lamps 5 are assembled and electrically connected to each other by means of the electrical connection apparatuses 1. The electrical interfaces 51 are, for example, the first electrical connection terminal 11 and the second electrical connection terminal 12 described hereinabove.

As shown in FIG. 8, the controller 7 is electrically connected to the electrical interfaces 51 of one lamp of the plurality of lamps 5. The controller 7 is configured to provide, by means of the electrical interfaces 51, control signals of the lamps to the lamp 5 electrically connected to the controller 7, and by means of the electrical connection apparatuses 1, the control signals are transmitted, via the electrical interfaces 51 of the plurality of lamps 5, to other lamps of the plurality of lamps 5. For example, the controller can receive a control instruction for a lamp, then transmit a corresponding control signal to the lamp through an electrical interface, and transmit the control signal to another lamp assembled together through another electrical interface of the lamp and an electrical connection apparatus electrically connected to the lamp. In exemplary embodiments, the controller can receive a control instruction from another smart device (e.g., a mobile phone, a PC, etc.) in a wireless manner, or the controller itself has a function of receiving an instruction directly inputted by a user (e.g., the controller is provided with a keyboard, a touch screen, etc.).

In particular, the plurality of lamps can be assembled together, and electrically connected, when assembled, via electrical connection apparatuses and electrical interfaces 51. It should be appreciated that although lamps 5 which are hexagonal when viewed from above are illustrated in FIG. 8, the lamps 5 may take any other shape suitable for assembling. For example, the lamp 5 is a polyhedron, the upper surface and the lower surface thereof are corresponding triangles, quadrilaterals, pentagons, hexagons or even N-gons, and the electrical interfaces 51 are provided in at least two of the side surfaces between the upper surface and the lower surface. In addition, the lamps 5 may also adopt other polyhedron shapes, and the electrical interfaces 51 are in two or more surfaces of the polyhedron, so that when multiple polyhedrons are assembled with each other, the electrical connection apparatuses and the electrical interfaces according to the present application are electrically connected to each other.

In this way, the plurality of lamps are assembled and electrically connected to each other by means of the electrical connection apparatuses, and the controller can simultaneously control the plurality of lamps; moreover, connections between the plurality of lamps are stable, and the interfaces are not easily damaged.

In the described embodiments of the present application, the description of each embodiment has its own emphasis. For the part not detailed in a certain embodiment, please refer to the relevant description of other embodiments.

In the several embodiments provided in the present application, it should be understood that the disclosed technical content may be implemented in other manners. The device embodiments described above are merely illustrative. For example, the division of a unit or a module is only a logical function division, and in actual implementation, there may be another division manner, for example, multiple units or modules or assemblies may be combined, or can be integrated into another system, or some features can be ignored or not executed. In addition, the coupling or direct coupling or communication connection shown or discussed may be an indirect coupling or communication connection through some interfaces, modules or units, and may be electrical or other forms.

The units or modules described as separate components may or may not be physically separated, and the components displayed as units or modules may or may not be physical units or modules, that is, may be located in one place, or may be distributed in a plurality of network units or modules. Some or all of the units or modules may be selected according to actual needs to achieve the purpose of the solution of the embodiments.

In addition, functional units/modules in the embodiments of the present application may be integrated into one processing unit/module, or the units/modules may exist alone physically, or two or more units/modules are integrated into one unit/module. The described integrated unit or module can be embodied in the form of hardware or in the form of a software functional unit or module.

If the integrated unit is implemented in the form of a software functional unit and is sold or used as an independent product, the integrated unit can be stored in a computer-readable storage medium. On the basis of such understanding, the part of the technical solution of the present application that contributes in essence or to the prior art or all or part of the technical solution may be embodied in the form of a software product stored in a storage medium. Several instructions are included in the storage medium to cause a computer device (which may be a personal computer, server or network device, etc.) to execute all or some of the steps of the methods of various embodiments of the present application. The foregoing storage medium includes: media such as a USB flash disk, a Read-Only Memory (ROM), a Random Access Memory (RAM), a removable hard disk, a magnetic disk, or an optical disk, and the like which can store program codes.

The description above only relate to preferred embodiments of the present application. It should be noted that for a person with ordinary skill in the art, several improvements and modifications can also be made without departing from the principle of the present application, and these improvements and modifications shall also be considered as within the scope of protection of the present application.

The invention claimed is:

1. An electrical connection apparatus, comprising:

a main body, the main body being strip-shaped, and the main body having a first end, a second end opposite to the first end, and a spacing structure provided between the first end and the second end;

a first electrical connection terminal, provided at the first end and configured to be electrically connected to a first electrical interface; and a second electrical connection terminal, provided at the second end and configured to be electrically connected to a second electrical interface, and the second electrical connection terminal being electrically connected to the first electrical connection terminal, wherein the spacing structure (i) is provided above the first electrical connection terminal and the second electrical connection terminal to function to separate the first electrical interface and the second electrical interface when the electrical connection apparatus is connected between the first electrical interface and the second electrical interface and (ii) has a platform portion and a step portion, the platform portion is provided at a part of the spacing structure facing towards the first end, the step portion is provided at a part of the spacing structure facing towards the second end, and wherein the step portion is higher than the platform portion, and the step portion matches a surface of the second electrical interface when the second electrical connection terminal is electrically connected to the second electrical interface; and wherein the first electrical connection terminal and the second electrical connection terminal are provided on a circuit board accommodated in the main body.

2. The electrical connection apparatus according to claim 1, further comprising:

a connecting structure, the connecting structure being configured to fix the electrical connection apparatus and the first electrical interface to each other when the first electrical connection terminal is electrically connected to the first electrical interface.

3. The electrical connection apparatus according to claim 2, wherein the connecting structure comprises a main body platform module and a corresponding female socket module, wherein the main body platform module is provided at the platform portion of the main body, the female socket module is provided at the first electrical interface, and the main body platform module fits the female socket module so as to fix the electrical connection apparatus and the first electrical interface to each other.

4. The electrical connection apparatus according to claim 2, wherein the connecting structure comprises a through hole and a bolt, the through hole being provided on the platform portion, and wherein when the first electrical connection terminal is electrically connected to the first electrical interface, the bolt passes through the through hole to fit a threaded hole at the first electrical interface, so as to fix the electrical connection apparatus and the first electrical interface to each other.

5. The electrical connection apparatus according to claim 2, wherein the connecting structure comprises a first snap-fit portion, and when the first electrical connection terminal is electrically connected to the first electrical interface, the first snap-fit portion is snap-fitted to a corresponding second snap-fit portion provided at the first electrical interface, so as to fix the electrical connection apparatus and the first electrical interface to each other.

6. The electrical connection apparatus according to claim 2, wherein the connecting structure comprises a first magnetic attachment portion, and when the first electrical connection terminal is electrically connected to the first electrical interface, the first magnetic attachment portion is attached to a corresponding second magnetic attachment portion provided at the first electrical interface, so as to fix the electrical connection apparatus and the first electrical interface to each other.

7. The electrical connection apparatus according to claim 1, wherein the first electrical connection terminal and the second electrical connection terminal are male plugs; and the first electrical connection terminal and the second electrical connection terminal are configured to transmit, when electrically connected to the first electrical interface and the second electrical interface respectively, at least one of electric power and electrical signal between the first electrical interface and the second electrical interface.

8. The electrical connection apparatus according to claim 1, wherein the first electrical interface and the second electrical interface are female plugs, and the first electrical interface and the second electrical interface are respectively provided on different lamp holders, and are configured to transmit at least one of electric power and electrical signal to a lamp on the lamp holder.

9. The electrical connection apparatus according to claim 1, wherein at least one of the platform portion and the step portion is provided with chamfers at both ends along an axial direction of the main body.

10. The electrical connection apparatus according to claim 1, wherein the first electrical connection terminal and the second electrical connection terminal are USB connection terminals.

11. An illumination system, comprising:

the electrical connection apparatuses according to claim 1, a plurality of lamps, each of the lamps having at least two electrical interfaces via which the plurality of lamps are assembled and electrically connected to each other by means of the electrical connection apparatuses; and a controller, the controller being electrically connected to the electrical interfaces of one lamp of the plurality of lamps, and wherein the controller is configured to provide, by means of the electrical interfaces, control signals of the lamps to the lamps electrically connected to the controller, and by means of the electrical connection apparatuses, the control signals are transmitted, via the electrical interfaces of the plurality of lamps, to other lamps of the plurality of lamps.

12. A lighting system comprising:

an assembly formed by a plurality of configurable lighting units remove-ably coupled together using one or more electrical connection apparatuses according to claim 1 to form one or more continuous shapes that are reconfigurable through re-arrangement of the plurality of configurable lighting units;

each electrical connection apparatus of the one or more electrical connection apparatuses formed in one lighting unit, each configurable lighting unit having one or more connectable subsections including at least an aperture for receiving a corresponding electrical connection apparatus formed on the next lighting unit to enable a flow of electricity between the lighting units.

13. The lighting system according to claim 12, wherein the one or more connecting apparatuses comprises a through hole and a bolt, the through hole being provided on the platform portion, and wherein the bolt passes through the through hole to fit a threaded hole so as to fix the electrical connection apparatus on the lighting unit.

14. The lighting system according to claim 12, wherein at least one lighting unit further having a controller mounted wherein, the controller is configured to provide, by receiving control signal, control signals of the lamps to the lighting unit electrically connected to the controller, and by means of the one or more electrical connection apparatuses, the control signals are transmitted to other lighting units removeably coupled together.

* * * * *